S. Brunson,

Tree Protector.

No. 104,418. Patented June 21. 1870.

WITNESSES.
E. H. Frost
D. S. Powers

INVENTOR.
Sterne Brunson
By Farwell, Ellsworth & Co.
Attorneys.

United States Patent Office.

STERNE BRUNSON, OF BENTON HARBOR, MICHIGAN.

Letters Patent No. 104,418, dated June 21, 1870.

IMPROVEMENT IN TREE-PROTECTOR.

The Schedule referred to in these Letters Patent and making part of the same.

To all whom it may concern:

Be it known that I, STERNE BRUNSON, of Benton Harbor, in the county of Berrien, in the State of Michigan, have invented a new and Improved Tree-Protector; and I do hereby declare that the following is a full and exact description thereof, reference being had to the accompanying drawing and to the letters of reference marked thereon.

The nature of my invention consists in adapting a device to the base of a tree, of such construction and character as to prevent the depositing of insects' eggs, or other larvæ, at or near the root of the tree, to afterward hatch into borers or other vermin to injure the tree, or the fruit or foliage of the same.

To enable others skilled in the art to make and use my invention, I will proceed to describe its construction and operation.

Figure 1:
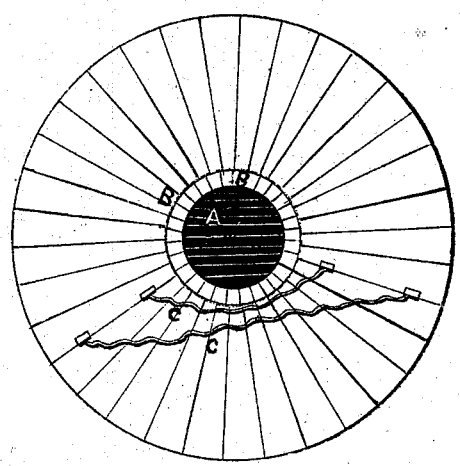

I cut out of pasteboard or paper, either plain or tarred, a circular piece, as shown in fig. 1, with a center hole at A cut longitudinally around the inside circle for a short distance outward, as shown at B, so as to enable the material to easily bend and enlarge or diminish the size of hole, and at the same time to make a soft yielding bearing about the body of the tree.

Figure 2:
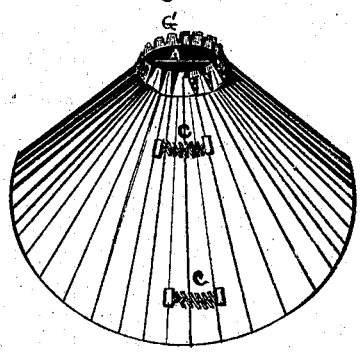

From the said inside hole outward the material is cut entirely open upon one side, so that the whole can be thrown into a conical shape, more or less, as shown in fig. 2.

By being brought into a conical shape it is readily made to encircle a larger or smaller tree, and to fit the body with tolerable closeness, while the lower edge of the cone is buried, more or less, in the soil.

The device is kept firmly to the tree by means of ties, or small yielding coil springs, (C C in fig. 2.)

These springs, or yielding ties, allow the device to open and yield to the growth of the tree.

It will be seen that the device closes around the tree so close as to exclude the entrance of insects of any mischievous size at the top, and being also imbedded in the earth at the bottom, cuts off all approach in that direction to all insects, millers, or moths, that do not burrow into the earth.

The principal object is to head off the insect that lays its eggs at the root and around the collar of the tree, out of which eggs borers are hatched to afterward invade the tree.

The design of my invention is to make and apply a protector that will protect the top root and surface collar of the tree from all insect larvæ, out of which evil might arise.

I also perforate the sides of my device with more or less small air-holes, to allow of free circulation of air inside and yet exclude noxious insects.

Tarred paper is found to be a good article of which to make the protectors, both from its shedding water, and because the tar is offensive to most insects.

In order to fit the protector closely about the tree, I provide the edge of the hole A with a series of incisions, by which points G are formed which extend upon and rest flatly against the trunk of the tree.

Claim.

What I claim as my invention, and desire to secure by Letters Patent, is—

The conical or inclined tree-protector, constructed as described, with the points G and yielding ties C, and adapted to fit around a tree just above the ground, with its lower edge imbedded in the soil, as herein set forth, for the purpose specified.

STERNE BRUNSON.

Witnesses:
G. H. FROST,
D. I. POUND.